United States Patent
Mejdrich et al.

(10) Patent No.: US 7,941,644 B2
(45) Date of Patent: May 10, 2011

(54) SIMULTANEOUS MULTI-THREAD INSTRUCTIONS ISSUE TO EXECUTION UNITS WHILE SUBSTITUTE INJECTING SEQUENCE OF INSTRUCTIONS FOR LONG LATENCY SEQUENCER INSTRUCTION VIA MULTIPLEXER

(75) Inventors: Eric Oliver Mejdrich, Rochester, MN (US); Adam James Muff, Rochester, MN (US); Matthew Ray Tubbs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 12/252,541

(22) Filed: Oct. 16, 2008

(65) Prior Publication Data
US 2010/0100712 A1   Apr. 22, 2010

(51) Int. Cl.
*G06F 9/46* (2006.01)
(52) U.S. Cl. .......................................... 712/214; 712/21
(58) Field of Classification Search .................. None
See application file for complete search history.

(56) References Cited

U.S. PATENT DOCUMENTS
| | | | | |
|---|---|---|---|---|
| 6,691,306 B1 * | 2/2004 | Cohen et al. | ........... | 717/139 |
| 6,711,667 B1 * | 3/2004 | Ireton | ........... | 712/35 |
| 7,136,989 B2 * | 11/2006 | Ishii | ........... | 712/23 |
| 2009/0198978 A1 * | 8/2009 | Greenhalgh et al. | ........... | 712/226 |

* cited by examiner

*Primary Examiner* — Kenneth S Kim
(74) *Attorney, Agent, or Firm* — Wood, Herron & Evans, LLP

(57) ABSTRACT

A processing unit includes multiple execution units and sequencer logic that is disposed downstream of instruction buffer logic, and that is responsive to a sequencer instruction present in an instruction stream. In response to such an instruction, the sequencer logic issues a plurality of instructions associated with a long latency operation to one execution unit, while blocking instructions from the instruction buffer logic from being issued to that execution unit. In addition, the blocking of instructions from being issued to the execution unit does not affect the issuance of instructions to any other execution unit, and as such, other instructions from the instruction buffer logic are still capable of being issued to and executed by other execution units even while the sequencer logic is issuing the plurality of instructions associated with the long latency operation.

25 Claims, 7 Drawing Sheets

SIMULTANEOUS MULTI-THREAD INSTRUCTIONS ISSUE TO EXECUTION UNITS WHILE SUBSTITUTE INJECTING SEQUENCE OF INSTRUCTIONS FOR LONG LATENCY SEQUENCER INSTRUCTION VIA MULTIPLEXER

FIELD OF THE INVENTION

The invention is generally related to data processing, and in particular to processor architectures and execution units incorporated therein.

BACKGROUND OF THE INVENTION

As semiconductor technology continues to inch closer to practical limitations in terms of increases in clock speed, architects are increasingly focusing on parallelism in processor architectures to obtain performance improvements. At the chip level, multiple processor cores are often disposed on the same chip, functioning in much the same manner as separate processor chips, or to some extent, as completely separate computers. In addition, even within cores, parallelism is employed through the use of multiple execution units that are specialized to handle certain types of operations. Pipelining is also employed in many instances so that certain operations that may take multiple clock cycles to perform are broken up into stages, enabling other operations to be started prior to completion of earlier operations. Multithreading is also employed to enable multiple instruction streams to be processed in parallel, enabling more overall work to be performed in any given clock cycle.

One area where parallelism continues to be exploited is in the area of execution units, e.g., fixed point or floating point execution units. Many floating point execution units, for example, are deeply pipelined. However, while pipelining can improve performance, pipelining is most efficient when the instructions processed by a pipeline are not dependent on one another, e.g., where a later instruction does not use the result of an earlier instruction. Whenever an instruction operates on the result of another instruction, typically the later instruction cannot enter the pipeline until the earlier instruction has exited the pipeline and calculated its result. The later instruction is said to be dependent on the earlier instruction, and phenomenon of stalling the later instruction waiting for the result of an earlier instruction is said to introduce "bubbles," or cycles where no productive operations are being performed, into the pipeline.

One technique that may be used to extract higher utilization from a pipelined execution unit and remove unused bubbles is to introduce multi-threading. In this way, other threads are able to issue instructions into the unused slots in the pipeline, which drives the utilization and hence the aggregate throughput up. Another popular technique for increasing performance is to use a single instruction multiple data (SIMD) architecture, which is also referred to as 'vectorizing' the data. In this manner, operations are performed on multiple data elements at the same time, and in response to the same SIMD instruction. A SIMD or vector execution unit typically includes multiple processing lanes that handle different datapoints in a vector and perform similar operations on all of the datapoints at the same time. For example, for an architecture that relies on quad(4)word vectors, an SIMD or vector execution unit may include four processing lanes that perform the identical operations on the four words in each vector.

The aforementioned techniques may also be combined, resulting in a multi-threaded vector execution unit architecture that enables multiple threads to issue SIMD instructions to an SIMD execution unit to process "vectors" of data points at the same time.

In addition, it is also possible to employ multiple execution units in the same processor to provide additional parallelization. The multiple execution units may be specialized to handle different types of instructions, or may be similarly configured to process the same types of instructions.

Typically, a scheduling algorithm is utilized in connection with issue logic to ensure that each thread in a multi-threaded architecture is able to proceed at a reasonable rate, with the number of bubbles in the execution unit pipeline(s) kept at a minimum. In addition, when multiple execution units are used, the issuance of instructions to such execution units may be handled by the same issue unit, or alternatively by separate issue units.

Another technique that may be used to improve the performance of a processor is to employ a microcode unit or sequencer to automatically generate instructions for execution by an execution unit. A microcode unit or sequencer responds to commands, e.g., via dedicated instructions in an instruction set, and in response, outputs a sequence of instructions to be executed by the processor. In much the same way that a software procedure can be used to perform a repeatable sequence of steps in response to a procedure call in a software program, a microcode unit or sequencer can be triggered by a command or instruction to perform a repeatable operation.

Microcode units or sequencers are particularly useful for performing long latency operations, i.e., operations that take a relatively long time to perform, and in the case of pipelined execution units, often require multiple passes through an execution pipeline. One example of a long latency operation for which the use of a microcode unit or sequencer might find benefit is in image processing, e.g., texture processing performed during rasterization of a graphical image. Rasterization is a process in 3D graphics where three dimensional geometry that has been projected onto a screen is "filled in" with pixels of the appropriate color and intensity. A texture mapping algorithm is typically incorporated into a rasterization process to paint a texture onto geometric objects placed into a scene.

In order to paint a texture onto a placed object in a scene, the pixels in each primitive making up the object are typically transformed from 3D scene or world coordinates (e.g., x, y and z) to 2D coordinates relative to a procedural or bitmapped texture (e.g., u and v). The fundamental elements in a texture are referred to as texels (or texture pixels), and being the fundamental element of a texture, each texel is associated with a single color. Due to differences in orientation and distance of the surfaces of placed geometric primitives relative to the viewer, a pixel in an image buffer will rarely correspond to a single texel in a texture. As a result, texture filtering is typically performed to determine a color to be assigned to a pixel based upon the colors of multiple texels in proximity to the texture mapped position of the pixel.

A number of texture filtering algorithms may be used to determine a color for a pixel, including simple interpolation, bilinear filtering, trilinear filtering, and anisotropic filtering, among others. With many texture filtering algorithms, weights are calculated for a number of adjacent texels to a pixel, the weights are used to scale the colors of the adjacent texels, and a color for the pixel is assigned by summing the scaled colors of the adjacent texels. The color is then either stored at the pixel location in a frame buffer, or used to update a color that is already stored at the pixel location.

Bilinear filtering, for example, uses the coordinates of a texture sample to perform a weighted average of four adjacent pixels, weighted according to how close the sample coordinates are to the center of the pixel. Bilinear filtering often can reduce the blockiness of closer details, but often does little to reduce the noise that is often found in distant details.

Trilinear filtering involves using MIP mapping, which uses a set of prefiltered texture images that are scaled to successively lower resolutions. The algorithm uses texture samples from the high resolution textures for portions of the geometry near to the camera, and low resolution textures for the portions distant to the camera. MIP mapping often reduces nearby pixelation and distant noise; however, detail in the distance is often lost and needlessly blurred. The blurriness is due to the texture samples being taken from a MIP level of the texture that has been pre-scaled to a low resolution in both the x and y dimensions uniformly, such that resolution is lost in the direction perpendicular to the direction that the texture is most compressed.

Anisotropic filtering involves taking multiple samples along a "line of anisotropy" which runs in the direction that the texture is most compressed. Each of these samples may be bilinear or trilinear filtered, and the results are then averaged together. This algorithm allows the compression to occur in only one direction. By doing so, less blurring often occurs in more distant features.

While the filtering calculations discussed above are often long latency operations, it has been found that conventional microcode units or sequencers suffer from a number of drawbacks that render such components sub-optimal for use in connection with performing filtering calculations in a processor, in particular within a multithreaded processor that utilizes multiple execution units. Conventional microcode units and sequencers, in particular, are typically upstream of, and thus coupled to the input of the instruction buffer logic for a processor.

In many designs, the same instruction buffer logic, which may include one or more instruction buffers, buffers the instructions to be executed by all of the execution units in a processor. Instruction fetch logic typically fetches instructions for the programs currently executing on the processor from memory (e.g., from an instruction cache) and stores those instructions in one or more instruction buffers. The instructions are then passed to the execution units for execution. When multiple execution units are served by the same instruction buffer logic, scheduling logic is used to issue instructions to appropriate execution units. In addition, when execution units are multi-threaded, scheduling logic manages the issuance of instructions from multiple threads.

A conventional microcode unit or sequencer, coupled upstream of the instruction buffer logic, suffers from a number of drawbacks that can reduce the performance of a processor that implements such a component. For example, most conventional microcode units or sequencers require several cycles to initialize a sequence, e.g., to calculate the address from which instructions for the sequence should be fetched. In addition, by being upstream of the instruction buffer logic, the decode of an instruction that triggers a microcode unit or sequencer will typically require later instructions already issued to an execution pipeline to be flushed before the desired sequence can start.

In addition, since a conventional microcode unit or sequencer is upstream of the instruction buffer logic that serves all of the execution units, whenever a sequence is be performed, typically all other instructions from the instruction buffer are blocked from executing on all execution units. Thus, when a sequence is being performed, a multi-threaded, multi-execution unit processor functions more or less as a single-threaded, single-execution unit processor, thus severely limiting the parallelism of the processor when sequences are being performed.

Therefore, a need exists in the art for a manner of improving the performance of long latency operations such as filtering operations in a multi-execution unit processor.

SUMMARY OF THE INVENTION

The invention addresses these and other problems associated with the prior art by utilizing sequencer logic that is disposed downstream of instruction buffer logic in a processing unit that utilizes multiple execution units, and that is responsive to a sequencer instruction present in an instruction stream. In response to such an instruction, the sequencer logic issues a plurality of instructions associated with a long latency operation to one execution unit, while blocking instructions from the instruction buffer logic from being issued to that execution unit. In addition, the blocking of instructions from being issued to the execution unit does not affect the issuance of instructions to any other execution unit, and as such, other instructions from the instruction buffer logic are still capable of being issued to and executed by other execution units even while the sequencer logic is issuing the plurality of instructions associated with the long latency operation. By implementing sequencer logic downstream of an instruction buffer, the startup and other latencies associated with conventional microcode units may be reduced or eliminated, and overall performance may be enhanced by enabling other execution units to continue to execute instructions while the sequencer logic is issuing instructions for a long latency operation.

Consistent with one aspect of the invention, a circuit arrangement includes first and second execution units, instruction buffer logic configured to supply instructions from at least one instruction stream to the first and second execution units, and sequencer logic coupled intermediate the instruction buffer logic and the first execution unit. The sequencer logic is configured to, in response to a sequencer instruction from the instruction stream, sequentially issue a plurality of instructions associated with a long latency operation to the first execution unit while blocking instructions from the instruction buffer logic such that the plurality of instructions are executed by the first execution unit. In addition, the second execution unit is configured to execute instructions supplied thereto by the instruction buffer logic while the sequencer logic blocks instructions from the instruction buffer logic.

Consistent with another aspect of the invention, instructions are executed in a processing unit of the type including first and second execution units and instruction buffer logic configured to supply instructions from at least one instruction stream to the first and second execution units. In response to receiving a sequencer instruction from the instruction stream, sequencer logic coupled intermediate the instruction buffer logic and the first execution unit is used to sequentially issue a plurality of instructions associated with a long latency operation to the first execution unit, instructions from the instruction buffer logic are blocked from being issued to the first execution unit while the sequencer logic sequentially issues the plurality of instructions associated with the long latency operation, and at least one instruction is issued from the instruction buffer logic for execution by the second execution unit while instructions are blocked from the being issued to the first execution unit.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Embodiments consistent with the invention utilize sequencer logic disposed downstream of the instruction buffer logic of a multi-execution unit processing unit to concurrently block instructions from the instruction buffer logic from being issued to an execution unit in the processing unit while issuing a plurality of instructions associated with a long latency operation to the execution unit, and without blocking instructions from being issued from the instruction buffer logic to any other execution unit in the processing unit. In one embodiment discussed hereinafter, for example, a multi-threaded, multi-execution unit processing unit utilizes an instruction blocking sequencer that responds to a command to begin issuing a bundle of instructions that make up a texture filter operation (or other long latency operation) by blocking all newer instructions issued to that thread and sequentially issuing instructions to the execution unit. The instruction blocking sequencer assumes all data required for the operation has been loaded into the register file before execution of the operation has begun. This assumption avoids the complexity associated with load instructions as might be present with a full microcode unit configured to perform this type of operations, such as data alignment issues and cache misses. Once the instruction blocking sequencer has fully performed the operation, the result is stored in a register file at an address specified by the original sequencer command. In addition, the instruction blocking sequencer is coupled to a single execution unit, rather than at the "top level" instruction buffer level encompassing all execution units, as is typical for conventional microcode units. Coupling to only one execution unit reduces circuit area and complexity of the design, and is significantly faster due to the overhead of starting up a microcode engine and the fact that the other execution units may continue some operations while the sequencer is performing an operation.

Hardware and Software Environment

Figure 1:
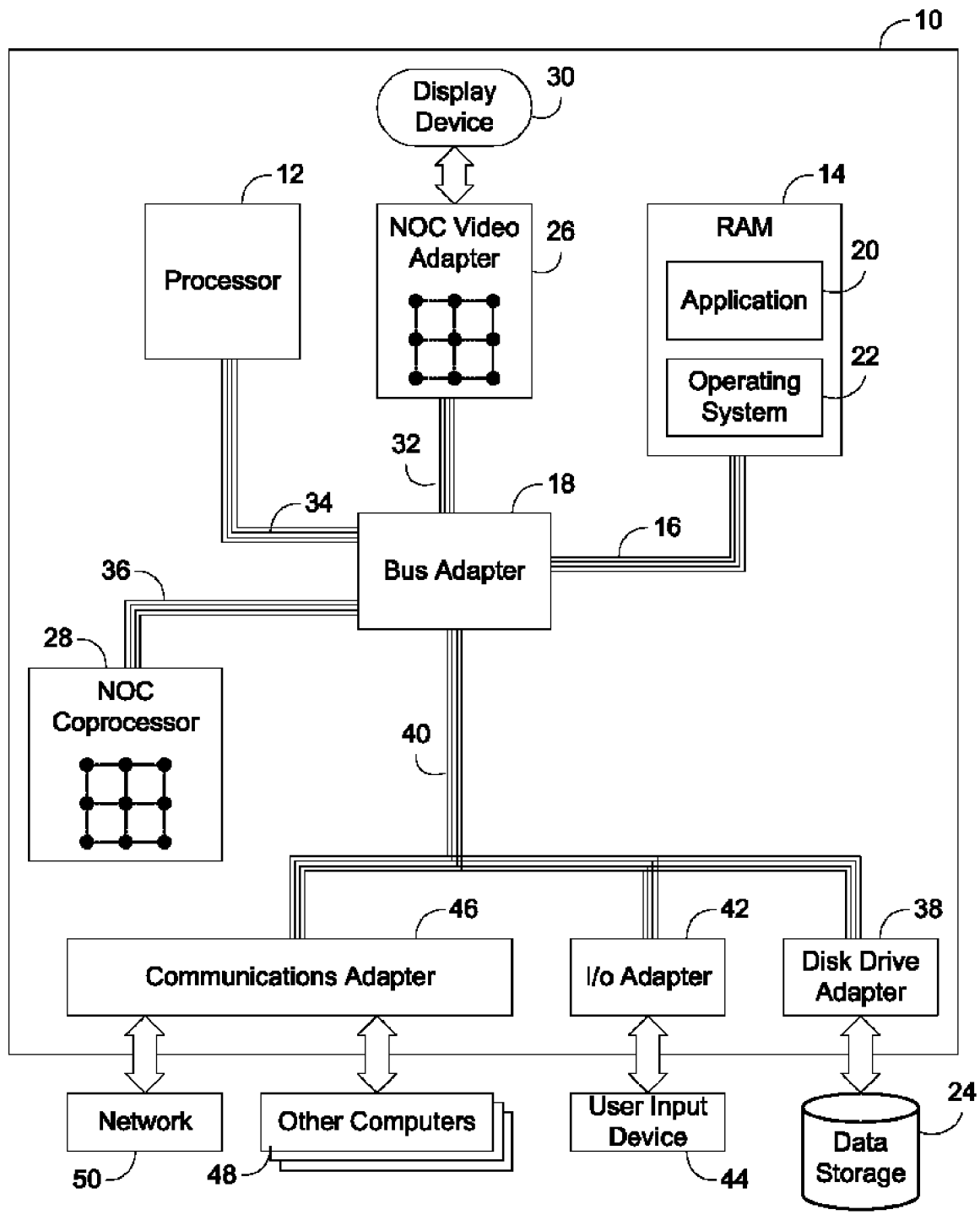
FIG. 1 is a block diagram of exemplary automated computing machinery including an exemplary computer useful in data processing consistent with embodiments of the present invention.

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™, Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
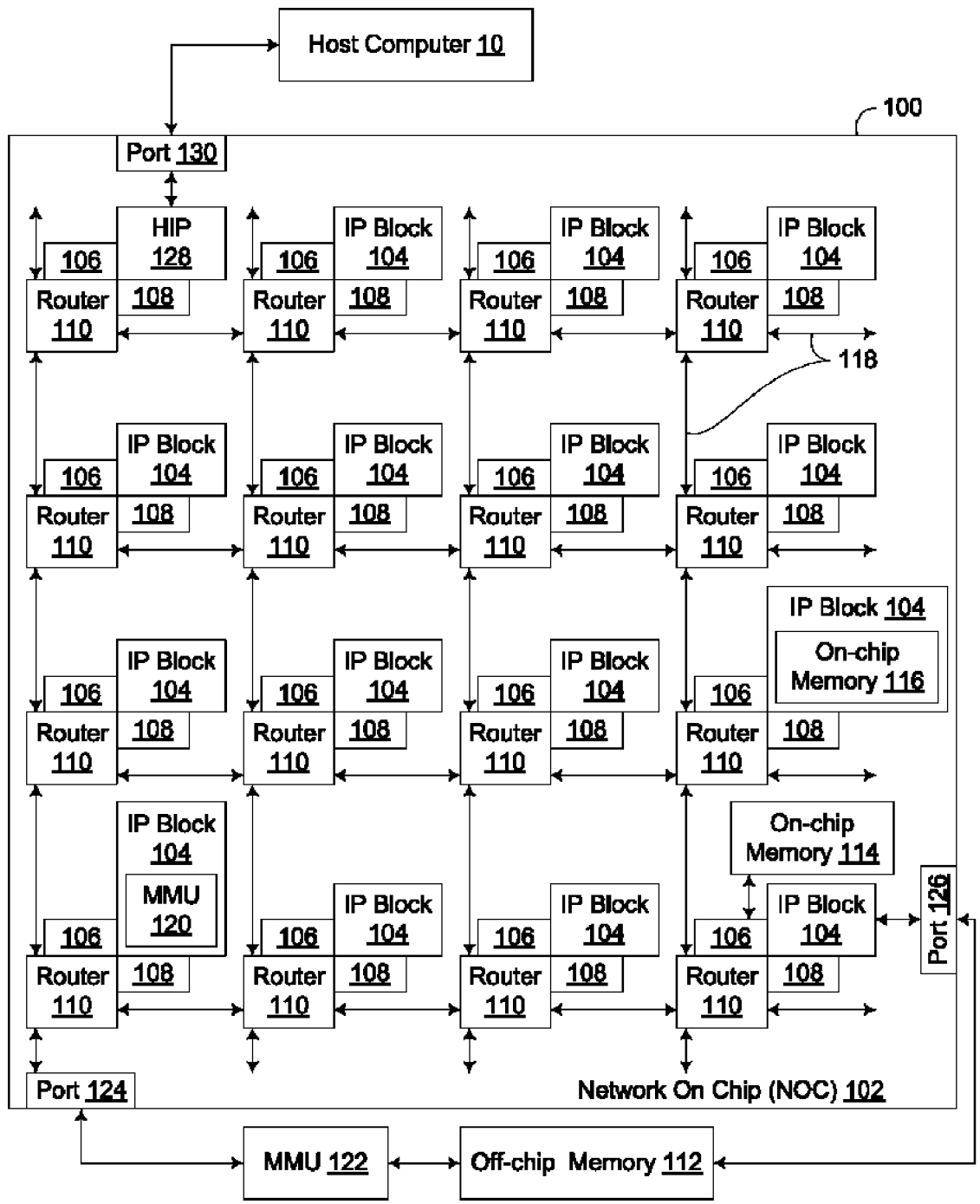
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices and data processing systems utilizing such devices, those of ordinary skill in the art having the benefit of the instant disclosure will appreciate that circuit arrangements consistent with the invention are capable of being distributed as program products in a variety of forms, and that the invention applies equally regardless of the particular type of computer readable or signal bearing media being used to actually carry out the distribution. Examples of computer readable or signal bearing media include, but are not limited to, physical, recordable type media such as volatile and non-volatile memory devices, floppy disks, hard disk drives, CD-ROMs, and DVDs (among others), and transmission type media such as digital and analog communication links.

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bidirectional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
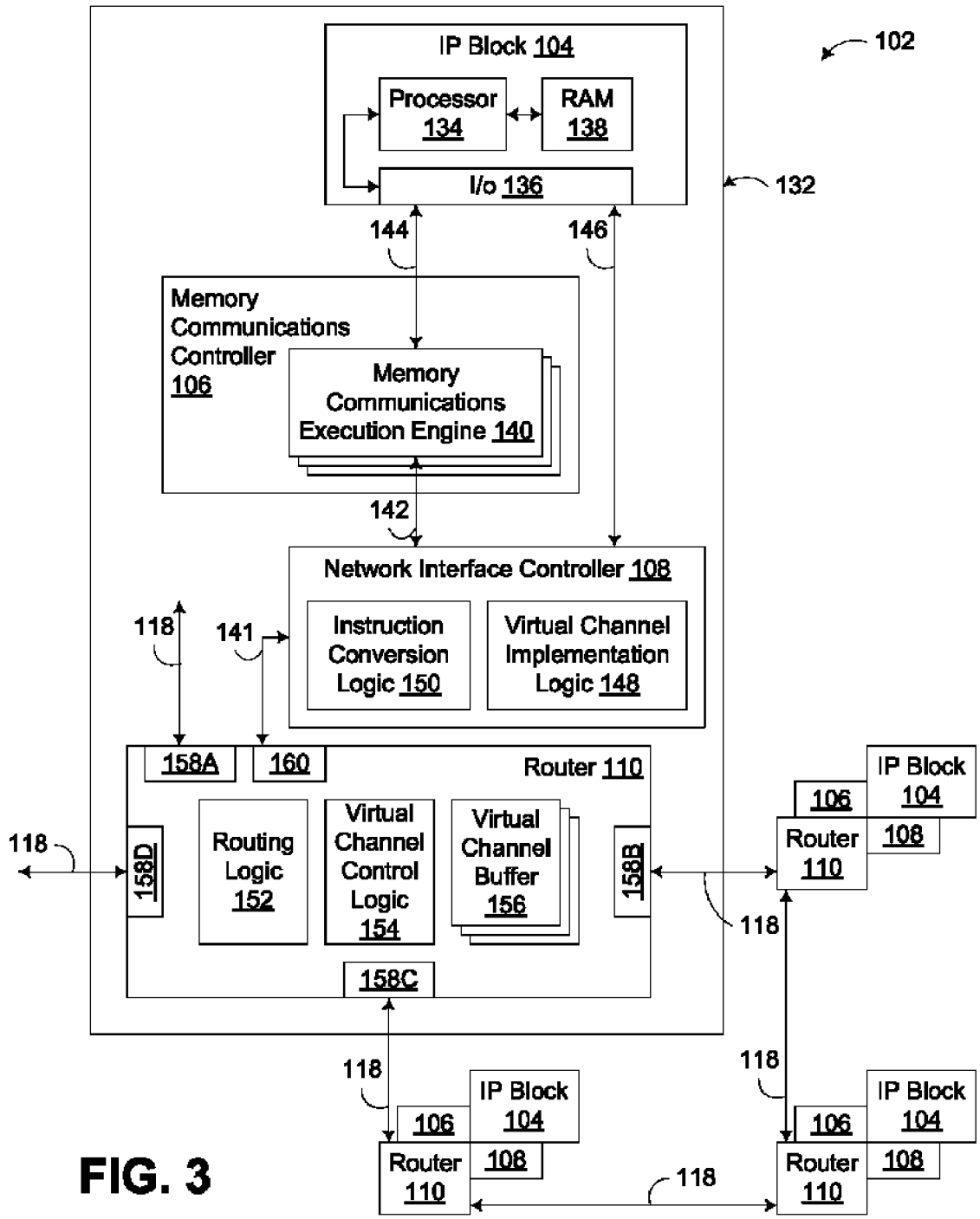
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114,116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
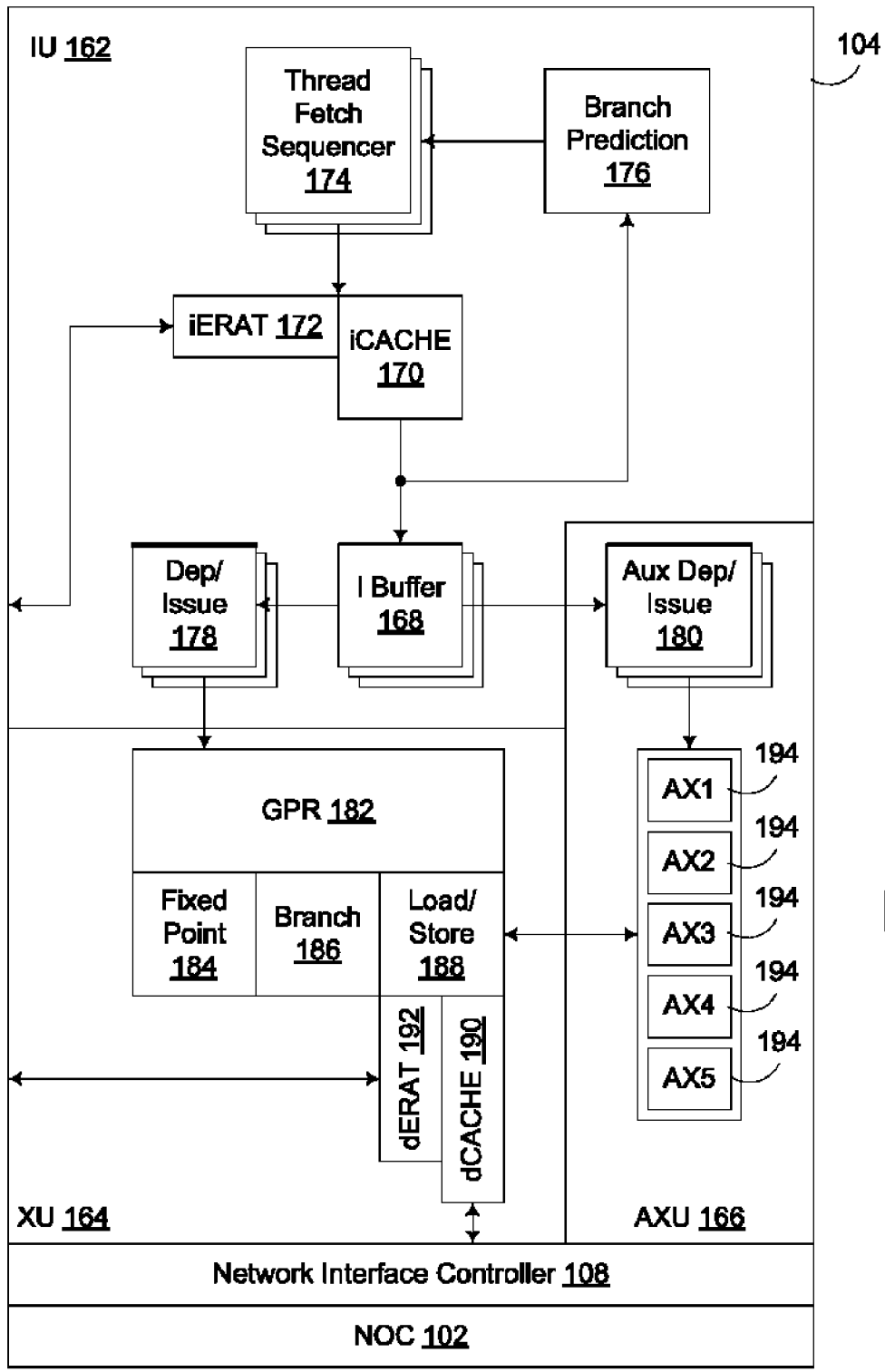
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Multi-Execution Unit Processing Unit With Instruction Blocking Sequencer Logic

Figure 5:
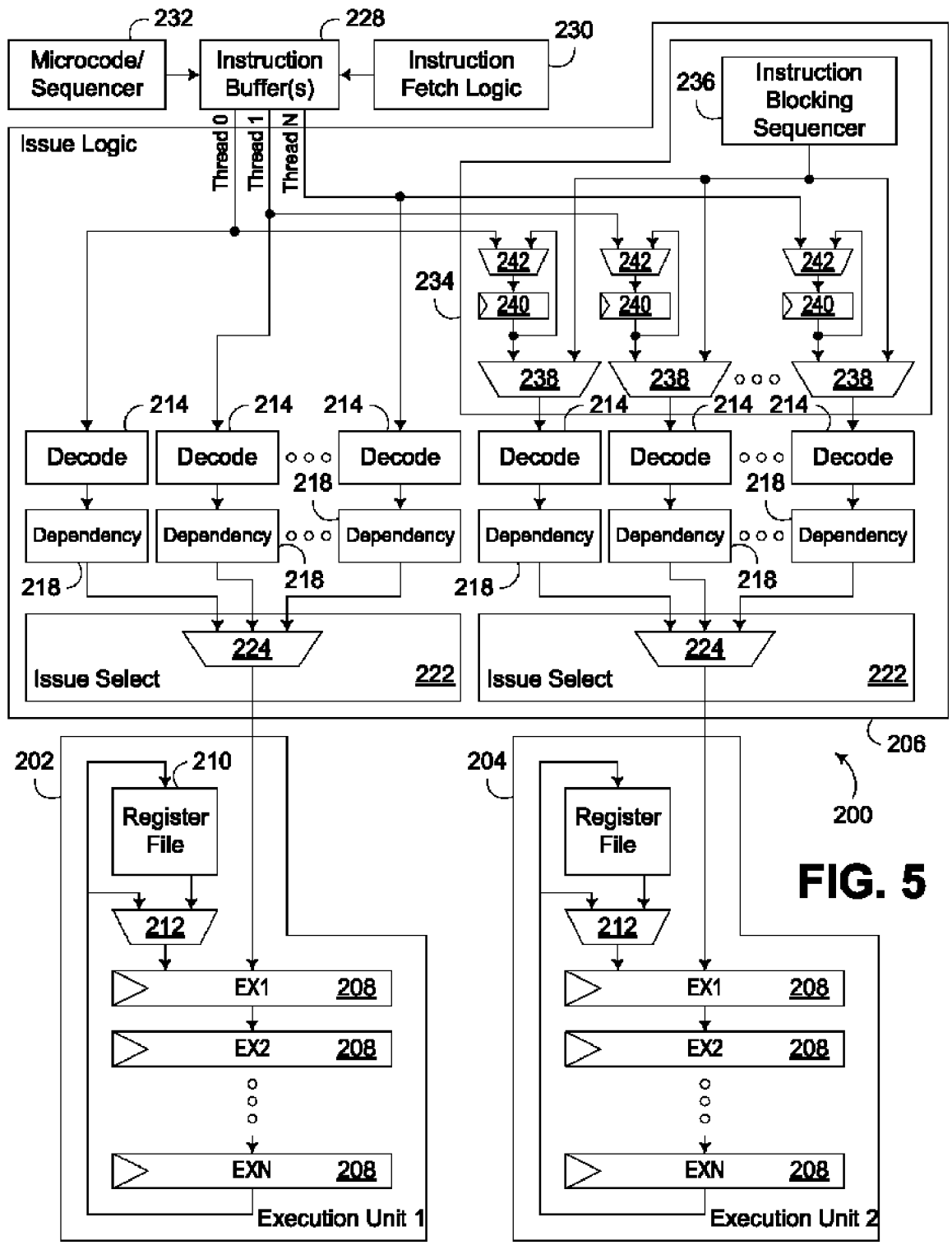
FIG. 5 is a block diagram of a processing unit incorporating instruction blocking sequencer logic consistent with the invention, and capable of being implemented within an IP block from the NOC of FIG. 2.

Turning now to FIG. 5, this figure illustrates an exemplary processing unit 200 incorporating multiple execution units (e.g., first and second execution units 202, 204) that process instructions issued thereto by issue logic 206, and incorporating instruction blocking sequencer logic consistent with the invention. Processing unit 200 may be implemented, for example, in an IP block such as an IP block 104 from FIGS. 1-4. In the alternative, processing unit 200 may be implemented in other processor architectures that issue and execute instructions, including single or multi-core microprocessors or microcontrollers.

Each execution unit 202, 204 processes instructions issued to the execution unit by issue logic 206, and includes a multi-stage execution pipeline with a plurality of execution stages 208 (separately denoted as execution stages EX1-EXN), which are capable of processing data stored in a register file 210 based upon the instructions issued by issue logic 206, and storing target data back to register file 210. Bypass logic 212 may also be provided intermediate to register file 210 and the execution pipeline to enable target data generated for one instruction that is to be used as an operand for a subsequent instruction to bypass the register file.

Each execution unit 202, 204 may be implemented as any of a number of different types of execution units, e.g., floating point units, fixed point units, or specialized execution units such as graphics processing units, encryption/decryption units, coprocessors, XML processing units, etc., and each execution unit may be configured as a scalar or vector (SIMD) execution unit. Execution units 202, 204 may be similarly configured to one another, and may handle the same types of instructions, or may be separately configured to handle different types of instructions (e.g., a fixed point unit and a floating point unit). In addition, more than two execution units may be used in processing unit 200 consistent with the invention. In one implementation, for example, each execution unit 202, 204 may be a vector floating point execution unit, and each register file 210 may be a vector register file storing vectors of floating point values in a set of vector registers.

Issue logic 206 is multi-threaded, supporting a plurality of hardware threads, identified in FIG. 5 as threads 0-N. Furthermore, issue logic 206 is capable of independently issuing instructions to each of execution units 202, 204, so for each execution unit, separate issue pipelines are allocated for each hardware thread. Each issue pipeline includes decode logic 214, which decodes each received instruction. Dependency conditions (i.e., conditions where a newer instruction must be stalled until the result from an older, executing instruction is ready) are detected in dependency logic 218. The instructions, once any dependencies are resolved, are selected for issue, and issued, by issue select logic 222, which selection is represented in FIG. 5 by multiplexer 224. Instructions are issued to the first stage (EX1) of the execution stage pipeline for the appropriate execution unit 202, 204. It will be appreciated that various numbers of hardware threads may be supported in different embodiments, and moreover, that the invention may be utilized in single threaded implementations, as well as in implementations where one or more hardware threads are dedicated to a particular execution unit, as opposed to the implementation of FIG. 5, where instructions associated with all hardware threads are capable being issued to any execution unit 202, 204.

Instruction buffer logic 228, including one or more instruction buffers, supplies instructions from one or more instruction streams to each of the hardware threads managed by issue logic 206. Of note, instruction buffer logic 228 buffers instructions to be execution by both execution units 202, 204, and as such, in many processing unit designs, the instruction buffer logic may be considered to be global instruction buffer logic that buffers all instructions executed by a particular processing unit design. Instruction buffer logic 228 is predominately fed with instructions fetched by instruction fetch logic 230, which as discussed above, manages the fetching of instructions into an instruction cache (not shown) from lower levels of memory to ensure that instructions will be available in the instruction cache when they are ready to be executed. In addition, instruction buffer logic 228 may also be fed with instructions by an optional global microcode unit or sequencer 232, which is upstream from the instruction buffer logic, and which is capable of issuing a sequence of instructions to an instruction buffer in instruction buffer logic 228 in response to a command.

In addition to, or in lieu of, a global microcode unit or sequencer 232, processing unit 200 includes execution unit-specific, instruction blocking sequencer logic 234 associated with only a subset of execution units, e.g., with a single execution unit such as execution unit 204 shown in FIG. 5. Instruction blocking sequencer logic 234 is disposed downstream of instruction buffer logic 228 and intermediate instruction buffer logic 228 and execution unit 204, and responds to a dedicated sequencer instruction associated with a particular hardware thread to begin issuing a bundle of instructions that make up a long latency operation such as a filtering operation by blocking all newer instructions issued to that thread and sequentially issuing instructions to the associated execution unit 204.

Instruction blocking sequencer logic 234 in the illustrated embodiment includes sequencer logic such as a sequencer 236 coupled to blocking logic including a plurality of hardware thread-specific multiplexers 238, stage latches 240 and feedback multiplexers 242. In the illustrated embodiment, each multiplexer 238 is allocated to a particular hardware thread and is disposed intermediate the thread-specific output of instruction buffer logic 228 and the issue pipeline for that particular thread, with a first input thereof configured to receive instructions from the thread-specific output of instruction buffer logic 228 via an associated feedback multiplexer 242 and stage latch 240. Normally, each multiplexer 238, 242 passes the instructions output by instruction buffer logic 228 for the associated hardware thread to the associated issue pipeline such that, for example, the issue pipelines for execution unit 204 are fed with instructions in the same manner as for the issue pipelines for execution unit 202.

Each multiplexer 238 also includes a second input that is coupled to an instruction output of sequencer 236. In addition, the selection of which input is passed to the output of each multiplexer 238 (e.g., via a select signal, not shown in FIG. 5) is also controlled by sequencer 236. In addition, each multiplexer 242 includes a feedback path from the output of the associated stage latch 240, with a select input of each multiplexer 242 controlled by sequencer 236 to selectively feed the current instruction stored in stage latch 240 back to the stage latch and thus effectively stall the instruction while the sequencer 236 outputs instructions to the second input of the associated multiplexer 238. Additional stall signals may also be output by sequencer 236 to other upstream stages, as well as to instruction buffer logic 228 to effectively block instructions from the associated thread.

Therefore, each multiplexer 238 is configured such that, when the second input is selected, instructions output by sequencer 236 are passed to the associated issue pipeline for the associated thread. In addition, when the first input of a multiplexer 238 is deselected, the feedback input of the associated multiplexer 242 is selected and a stall signal is asserted to instruction buffer logic 242 and any other upstream stages, instructions for the associated thread that are awaiting issue in instruction buffer logic 228 are effectively blocked.

Sequencer 236 is configured such that, in response to the receipt of an instruction associated with a particular hardware thread from instruction buffer logic 228 and formatted as a sequencer instruction (e.g., via a unique opcode), the sequencer selects the second input of that multiplexer 238 associated with the same hardware thread as the sequencer instruction, selects the feedback input of the associated multiplexer 242, asserts a stall signal to instruction buffer logic 228 and outputs a sequence of instructions associated with the long latency operation associated with that sequencer instruction to the second input of the multiplexer. During that time, other instructions are blocked from being passed from instruction buffer logic 228 to the associated issue pipeline.

Figure 6:
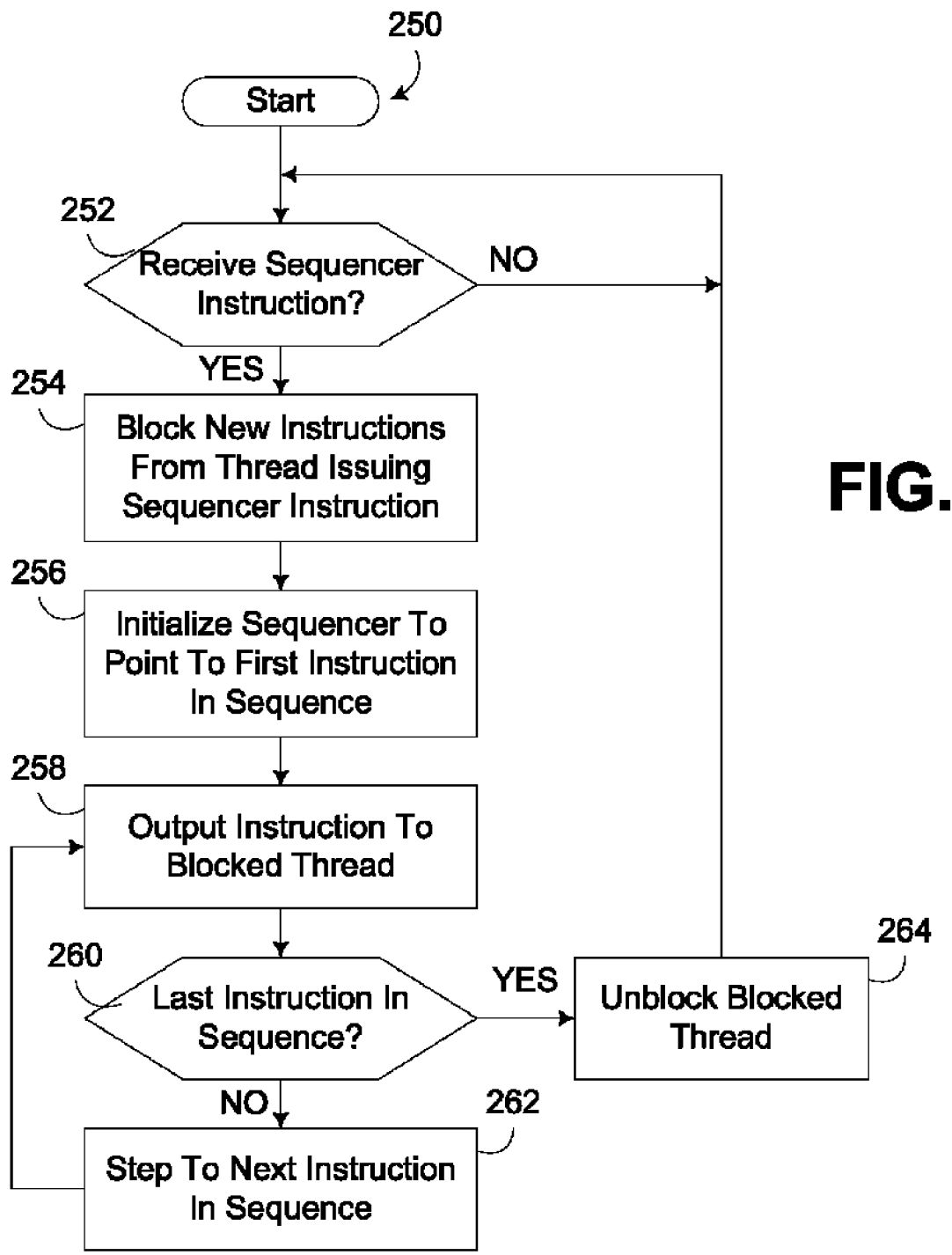
FIG. 6 is a flowchart illustrating the operation of the instruction blocking sequencer logic referenced in FIG. 5.

FIG. 6, for example, illustrates at 250 an exemplary sequence of operations that may be performed by sequencer 236. In particular, sequencer 236 may await the reception of a sequencer instruction in block 252. Once such an instruction is received, control passes to block 254 to block new instructions from the hardware thread that issued the sequencer instruction, e.g., by controlling the associated multiplexers 238, 242 for the thread, and stalling the instruction buffer logic, in the manner described above.

Next, the sequencer is initialized in block 256 to point to the first instruction in the sequence associated with the sequencer instruction. It will be appreciated, for example, that sequencer 236 may support only a single long latency operation and associated sequence, or may support multiple such operations and sequences. Separate sequencer instructions may be associated with different long latency operations, and may be distinguished from one another, for example, by unique opcodes, unique secondary opcodes, or via operands (e.g., by storing an index to one of a plurality of sequences supported by the sequencer in an operand register).

Next, in block 258, sequencer 236 outputs the first instruction in the selected sequence to the issue pipeline of the blocked hardware thread, and control passes to block 260 to determine whether the last instruction in the sequence has been output by the sequencer. If not, control passes to block 262 to step to the next instruction in the sequence, and control then passes back to block 258 to output the next instruction in the sequence to the blocked thread.

Once the last instruction in the sequence has been output by the sequencer, block 260 passes control to block 264 to unblock the blocked thread (e.g., by controlling the associated multiplexers 238, 242 for the thread and deasserting the stall signal in the manner described above. Control then returns to block 252 to await future sequencer instructions.

It will be appreciated that the herein-described instruction blocking sequencer logic may be used to implement practically any long latency operation that may be desired for a particular computing application, e.g., filtering operations, division operations, square root operations, encryption/security operations, compression/decompression operations, transform operations such as Fast Fourier Transforms, or any other operations that have long latencies and typically require multiples passes through an execution pipeline.

In the illustrated embodiment, the instruction blocking sequencer logic desirably assumes all data required for the long latency operation has been loaded into the register file before execution of the operation has begun. This assumption avoids the complexity associated with load instructions as might be present with a global microcode unit configured to perform a similar type of operation, such as data alignment issues and cache misses. Once instruction blocking sequencer logic has fully performed the operation, the result is typically stored in a register file at an address specified by the original sequencer command. In addition, since the instruction blocking sequencer logic is coupled to a single execution unit, rather than at the "top level" instruction buffer level encompassing all execution units, as is typical for conventional microcode units, the circuit area and complexity of the instruction blocking sequencer logic may be reduced, and the performance may be improved due to avoiding the overhead of starting up a microcode engine and the fact that the other execution units may continue some operations while the instruction blocking sequencer logic is performing an operation.

It will be appreciated, however, that a sequence output by instruction blocking sequencer logic consistent with the invention may or may not include load and/or store operations associated with a long latency operation, e.g., to load input data required by the sequence or store output data generated by the sequence. In addition, the target(s) in which to store the result, and/or the source(s) of the input data to be used by the sequence, may be specified in the sequencer instruction, e.g., as operands thereto, or may be predefined for the sequencer. For example, it may be desirable to require only one operand in the sequencer instruction to identify a first register for the input data for the sequence, and assume that other input data will be stored in the next N sequential registers. Other manners of providing input data to, and storing output data from, a sequence may be used consistent with the invention.

As noted above, instruction blocking sequencer logic consistent with the invention may be used to perform a number of different types of long latency operations. As an example, it may be desirable to utilize an instruction blocking sequencer logic to implement a bilinear filtering operation for use in a 3D rasterization algorithm. Bilinear filtering uses the coordinates of the texture sample to perform a weighted average of four adjacent texels, weighted according to how close the sample coordinates are to the center of the pixel.

The algorithm for computing each final bilinear filtered pixel is typically computed as shown in Table I below:

TABLE I

Bilinear Filtering Calculation

Figure 7:
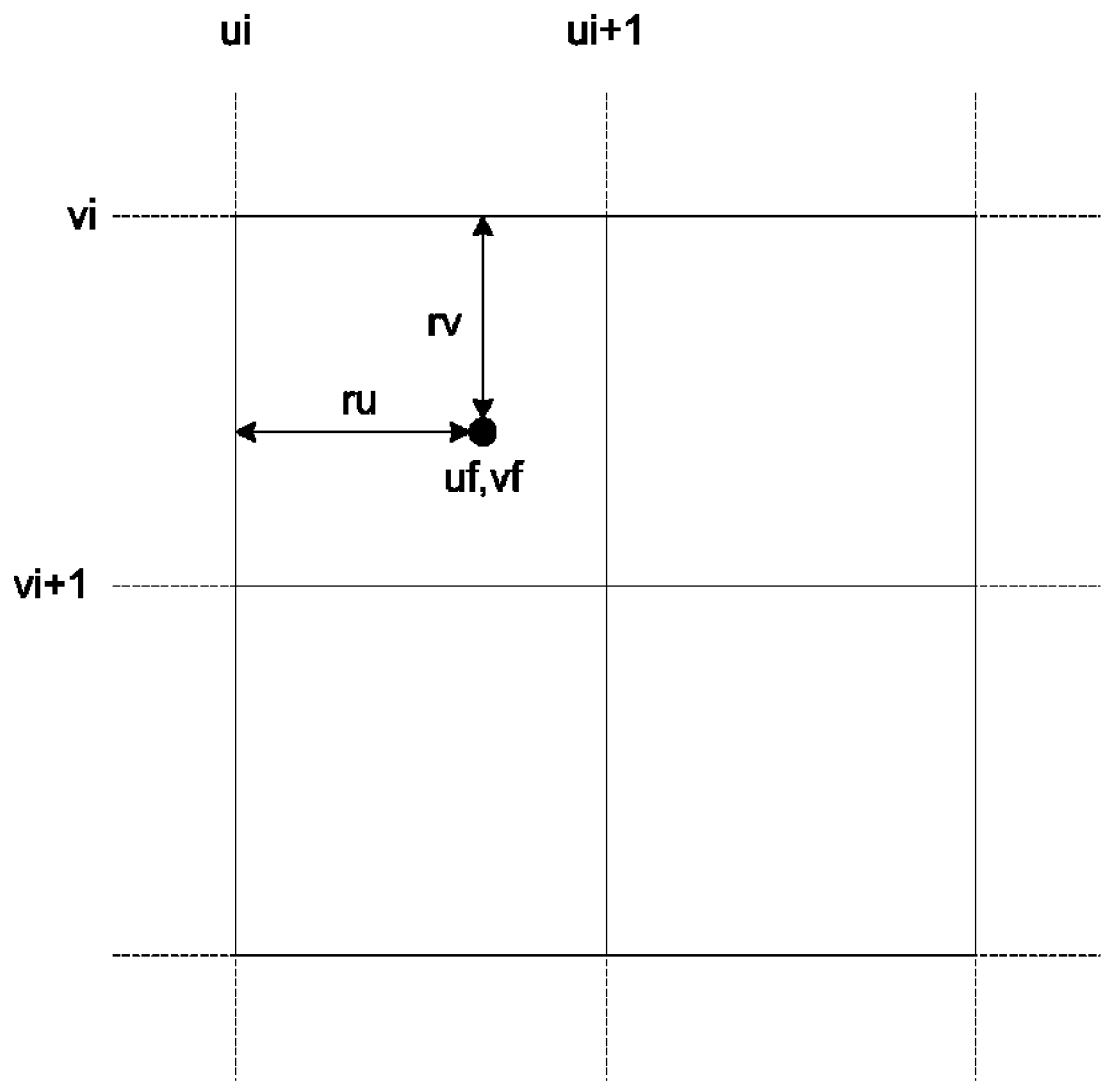
FIG. 7 is a graphical illustration of a texel coordinate system, illustrating the mapping of a pixel to a texture.

| Filtered pixel = | (texcolor(ui , vi) | * | (1 − ru) | * | (1 − rv) | + |
| --- | --- | --- | --- | --- | --- | --- |
| | texcolor(ui+1, vi) | * | ( ru) | * | (1 − rv) | + |
| | texcolor(ui ,vi+1) | * | (1 − ru) | * | ( rv) | + |
| | texcolor(ui+1,vi+1) | * | (1 − ru) | * | (1 − rv))/4 | | where uf, vf are the texture coordinates of the sample point in floating point format, ru, rv are the fractional portions of the uf and vf coordinates, respectively (fmod(uf, 1.0), fmod(vf, 1.0)), ui, vi are the integer portions of the texture coordinates, and texcolor(u,v) is the color of the texel at u,v. FIG. 7 illustrates these variables graphically.

Essentially, the aforementioned bilinear filtering algorithm assumes the center of the pixel to be at the integer boundaries (ui, vi) and performs a weighted average of the four closest texels from the texture map weighted by their proximity to the original texture sample point. Other types of texture filtering that are much more computationally intensive (e.g., trilinear and anisotropic filtering) may also be used consistent with the invention, but the discussion hereinafter will focus on bilinear filtering for simplicity.

A conventional vector floating point execution unit, e.g., supporting the Power architecture VMX128 instruction set, might accomplish a bilinear filtering operation using the instruction stream shown in Table II below:

TABLE II

Bilinear Filtering Instruction Stream

| load | t1, addr_row1, 0 | /* load texel 1 */ |
| --- | --- | --- |
| load | t2, addr_row1, 16 | /* load texel 2 */ |
| load | t3, addr_row2, 0 | /* load texel 3 */ |
| load | t4, addr_row2, 16 | /* load texel 4 */ |
| vmod | ru, uf, const_one | /* find fractional portion of uf */ |
| vmod | rv, vf, const_one | /* find fractional portion of vf */ |
| vsubfp | mru, const_one, ru | /* find 1−ru */ |
| vsubfp | mrv, const_one, rv | /* find 1−rv */ |
| vmulfp | w1, mru, mrv | /* find 1st pixel weighting */ |
| vmulfp | w2, ru, mrv | /* find 2nd pixel weighting */ |
| vmulfp | w3, mru, rv | /* find 3rd pixel weighting */ |
| vmulfp | w4, ru, rv | /* find 4th pixel weighting */ |
| vmulfp | wavg, t1, w1 | /* t1 through t4 contain the texture */ |
| vmaddfp | wavg, t2, w2, wavg | /* map colors for pixels 1 − 4 */ |
| vmaddfp | wavg, t3, w3, wavg | |
| vmaddfp | wavg, t4, w4, wavg | |
| vmulfp | wavg, wavg, const_.25 | /* divide by 4 */ | where uf and vf are the floating point coordinates of the original texture sample point, addr_row1 is the address of the first texel, (upper left of the four texels), addr_row2 is the address of the third texel, (lower left of the four texels), and assuming that each texel is 16 bytes, and that the texture data is organized in a typical manner, in scan lines. The filtered pixel result will be stored in wavg.

Consistent with the invention, however, the aforementioned instruction stream may be implemented within the instruction blocking sequencer logic, and output by such logic in response to a sequencer instruction that is decoded so as to trigger the sequencer logic to implement the sequence. An example format for a sequencer instruction that may be used to trigger the instruction blocking sequencer logic is shown below in Table III:

TABLE III

Bilinear Filtering Sequencer Instruction Format

| texfilter_seq_bilinear | wavg, uf, vf, addr_row1, addr_row2 |
| --- | --- |

With this instruction format, it is assumed that the wavg, uf, vf, addr_row1 and addr_row2 parameters are specified in the instruction. Alternatively, the sequencer may just assume that those source operands are always in predetermined registers. Alternatively, a sequencer instruction may specify a starting register, with the assumption made that the remaining operands are in the next consecutive registers. In addition, the constants used in the sequence may be assumed to be in certain registers, or they may be generated by the sequence.

Embodiments of the invention therefore allow for complex, long latency operations such as texture filtering to be performed by a small execution unit-specific sequencer instead of a full microcode unit. This configuration allows for a great deal of flexibility with applications needing long latency operations, while avoiding the performance issues associated with traditional microcode units. In particular, rather than requiring a flush of an execution pipeline, as is commonly required with a global microcode unit or sequencer that is disposed upstream of the instruction buffer logic, instruction blocking sequencer logic consistent with the invention, which are disposed downstream of the instruction buffer logic, typically avoid the need to flush the execution pipeline, and only require later instructions to be blocked while the sequencer logic is outputting a sequence of instructions to the execution unit. In addition, issue buffer logic can still output instructions for execution by other execution units while the sequencer logic is outing the sequence of instructions, and when multi-threaded issue logic is utilized, instructions from other hardware threads can still be issued to the same execution unit as that to which sequencer logic is currently outputting a sequence of instructions, thus minimizing the adverse impact on other instruction streams.

Various modifications may be made without departing from the spirit and scope of the invention. For example, rather than utilizing a single sequencer for all hardware threads, a sequencer may support concurrent output of sequences to different threads, or separate sequencers may be utilized for each hardware thread. Other modifications will be apparent to one of ordinary skill in the art. Therefore, the invention lies in the claims hereinafter appended.

What is claimed is:

1. A circuit, comprising:
first and second execution units;
instruction buffer logic configured to supply instructions from a plurality of threads for the first and second execution units;
a multithreaded issue unit coupled to the instruction buffer logic and the first and second execution units, the multithreaded issue unit including first and second issue select logic respectively configured to output instructions from the plurality of threads to the first and second execution units;
first and second multiplexers coupled to the first issue select logic, the first and second multiplexers respectively associated with first and second threads from among the plurality of threads, each of the first and second multiplexers including an output in communication with the first issue select logic and first and second inputs, wherein the first input of each of the first and second multiplexers is coupled to the instruction buffer logic to receive instructions therefrom; and a sequencer coupled to the second inputs of the first and second multiplexers, the sequencer configured to, in response to a filtering instruction associated with the first thread and output by the instruction buffer logic, control the first multiplexer to select the second input to block instructions associated with the first thread and received from the instruction buffer logic from execution by the first execution unit, and sequentially output a plurality of instructions associated with a filtering operation to the second input of the first multiplexer while the second input of the first multiplexer is selected such that the plurality of instructions associated with the filtering operation are executed by the first execution unit;

wherein the first issue select logic is configured to output instructions associated with the second thread and provided by the issue select logic via the first input of the second multiplexer for execution by the first execution unit while instructions associated with the first thread are blocked from execution by the first execution unit, and wherein the second issue select logic is configured to output instructions supplied thereto by the instruction buffer logic for execution by the second execution unit while instructions associated with the first thread are blocked from execution by the first execution unit.

2. A circuit, comprising:
first and second execution units;
instruction buffer logic configured to supply instructions from at least one instruction stream for the first and second execution units; and
sequencer logic coupled intermediate the instruction buffer logic and the first execution unit, the sequencer logic configured to, in response to a sequencer instruction from the instruction stream and supplied by the instruction buffer logic, sequentially issue a plurality of instructions associated with a long latency operation to the first execution unit while blocking logic blocks instructions from being supplied by the instruction buffer logic to the first execution unit such that the plurality of instructions are executed by the first execution unit, wherein the second execution unit is configured to execute instructions supplied thereto by the instruction buffer logic while the blocking logic blocks instructions from the instruction buffer logic, wherein the blocking logic includes a multiplexer having an output and first and second inputs, the output configured to pass instructions received at the first and second inputs to the first execution unit, the first input of the multiplexer coupled to the instruction buffer logic to receive instructions therefrom and the second input of the multiplexer configured to receive the plurality of instructions associated with the long latency operation.

3. The circuit of claim 2, wherein the sequencer instruction is configured to perform a filtering operation, and wherein the plurality of instructions are configured to implement a plurality of calculations in the filtering operation.

4. The circuit of claim 3, wherein the filtering operation is selected from among the group consisting of an anisotropic texture filtering operation, a bilinear texture filtering operation, and a trilinear texture filtering operation.

5. The circuit of claim 2, further comprising a register file coupled to the first execution unit, wherein the register file is configured to be loaded with input data for the sequencer instruction in response to at least one other instruction previously supplied by the instruction buffer logic, and wherein at least one of the plurality of instructions is configured to store output data for the sequencer instruction in a register in the register file that is specified by the sequencer instruction.

6. The circuit of claim 2, wherein the instruction buffer logic is multithreaded and is configured to output instructions from a plurality of threads, and wherein the sequencer logic is configured to block instructions from the instruction buffer logic only for those instructions that are associated with the same thread as that for the sequencer instruction such that instructions from at least one other thread are not blocked while the sequencer logic is sequentially issuing the plurality of instructions.

7. The circuit of claim 6, wherein the first execution unit is configured to execute at least one instruction from the at least one other thread while the sequencer logic blocks instructions associated with the same thread as that for the sequencer instruction.

8. The circuit of claim 2, further comprising microcode logic separate from the sequencer logic and configured to output a second plurality of instructions to the instruction buffer logic.

9. The circuit of claim 2, further comprising:
decode logic coupled to the output of the multiplexer and configured to decode instructions received thereby;
dependency logic coupled to the decode logic and configured to resolve dependencies between instructions; and
issue select logic coupled to the dependency logic and configured to issue instructions to the first execution unit.

10. The circuit of claim 9, wherein the instruction buffer logic is configured to output instructions from a plurality of threads, wherein the decode logic, dependency logic, and multiplexer are respectively first decode logic, dependency logic, and a first multiplexer that are each associated with a first thread among the plurality of threads, the circuit further comprising:
a second multiplexer associated with a second thread among the plurality of threads and having an output and first and second inputs, the output of the second multiplexer configured to pass instructions received at the first and second inputs to the first execution unit, the first input of the second multiplexer coupled to the instruction buffer logic to receive instructions from the second thread therefrom and the second input of the multiplexer configured to receive instructions generated by the sequencer logic in response to a second sequencer instruction;
second decode logic coupled to the output of the second multiplexer and configured to decode instructions received thereby; and
second dependency logic coupled to the second decode logic and configured to resolve dependencies between instructions.

11. The circuit of claim 10, wherein the issue select logic is additionally coupled to the second dependency logic, and wherein during execution of the first sequencer instruction, the sequencer logic is configured to block instructions from the first thread by controlling the first multiplexer to select the second input thereof, and to allow instructions from the second thread to be executed by the first execution unit by controlling the second multiplexer to select the first input thereof.

12. An integrated circuit device including the circuit of claim 2.

13. A program product comprising a recordable computer readable medium and logic definition program code resident on the computer readable medium and defining the circuit of claim 2.

14. A method of executing instructions in a processing unit of the type including first and second execution units and instruction buffer logic configured to supply instructions from at least one instruction stream for the first and second execution units, the method comprising, in response to receiving a sequencer instruction from the instruction stream and supplied by the instruction buffer logic:
using sequencer logic coupled intermediate the instruction buffer logic and the first execution unit to sequentially issue a plurality of instructions associated with a long latency operation to the first execution unit;
blocking instructions from the instruction buffer logic from being issued to the first execution unit while the sequencer logic sequentially issues the plurality of instructions associated with the long latency operation; and
issuing at least one instruction from the instruction buffer logic for execution by the second execution unit while blocking instructions from being issued to the first execution unit,
wherein blocking instructions from being issued to the first execution unit is performed by a multiplexer having an output and first and second inputs, the output configured to pass instructions received at the first and second inputs to the first execution unit, the first input of the multiplexer coupled to the instruction buffer logic to receive instructions therefrom and the second input of the multiplexer configured to receive the plurality of instructions associated with the long latency operation.

15. The method of claim 14, wherein the sequencer instruction is configured to perform a filtering operation, and wherein the plurality of instructions are configured to implement a plurality of calculations in the filtering operation.

16. The method of claim 15, wherein the filtering operation is selected from among the group consisting of an anisotropic texture filtering operation, a bilinear texture filtering operation, and a trilinear texture filtering operation.

17. The method of claim 14, further comprising:
loading a register file coupled to the first execution unit with input data for the sequencer instruction in response to at least one other instruction previously supplied by the instruction buffer logic; and
storing output data for the sequencer instruction in a register in the register file that is specified by the sequencer instruction in response to execution of at least one of the plurality of instructions by the first execution unit.

18. The method of claim 14, wherein the instruction buffer logic is multithreaded and is configured to output instructions from a plurality of threads, and wherein blocking instructions from the instruction buffer logic from being issued to the first execution unit while the sequencer logic sequentially issues the plurality of instructions associated with the long latency operation includes blocking only those instructions that are associated with the same thread as that for the sequencer instruction such that instructions from at least one other thread are not blocked while the sequencer logic is sequentially issuing the plurality of instructions.

19. The method of claim 18, further comprising executing at least one instruction from the at least one other thread in the first execution unit while the sequencer logic blocks instructions associated with the same thread as that for the sequencer instruction.

20. The method of claim 14, further comprising issuing a second plurality of instructions to the instruction buffer logic using microcode logic separate from the sequencer logic.

21. The method of claim 14, further comprising:
using decode logic coupled to the output of the multiplexer to decode instructions received thereby;
using dependency logic coupled to the decode logic to resolve dependencies between instructions; and
using issue select logic coupled to the dependency logic to issue instructions to the first execution unit.

22. The method of claim 21, wherein the instruction buffer logic is configured to output instructions from a plurality of threads, wherein the decode logic, dependency logic, and multiplexer are respectively first decode logic, dependency logic, and a first multiplexer that are each associated with a first thread among the plurality of threads, wherein the sequencer logic includes a second a second multiplexer associated with a second thread among the plurality of threads and having an output and first and second inputs, the output of the second multiplexer configured to pass instructions received at the first and second inputs to the first execution unit, the first input of the second multiplexer coupled to the instruction buffer logic to receive instructions from the second thread therefrom and the second input of the multiplexer configured to receive instructions generated by the sequencer logic in response to a second sequencer instruction, the method further comprising:
using second decode logic coupled to the output of the second multiplexer to decode instructions received thereby; and
using second dependency logic coupled to the second decode logic to resolve dependencies between instructions.

23. The method of claim 22, wherein the issue select logic is additionally coupled to the second dependency logic, and wherein blocking instructions from the instruction buffer logic from being issued to the first execution unit while the sequencer logic sequentially issues the plurality of instructions associated with the long latency operation includes controlling the first multiplexer to select the second input thereof, the method further comprising allowing instructions from the second thread to be executed by the first execution unit while the sequencer logic sequentially issues the plurality of instructions associated with the long latency operation by controlling the second multiplexer to select the first input thereof.

24. A circuit, comprising:
first and second execution units;
instruction buffer logic configured to supply instructions from at least one instruction stream for the first and second execution units;
a multithreaded issue unit coupled to the instruction buffer logic and the first and second execution units, the multithreaded issue unit including first and second issue select logic respectively configured to output instructions to the first and second execution units; and
sequencer logic coupled intermediate the instruction buffer logic and the first execution unit, the sequencer logic configured to, in response to a sequencer instruction from the instruction stream and supplied by the instruction buffer logic, sequentially issue a plurality of instructions associated with a long latency operation to the first execution unit while blocking logic blocks instructions from being supplied by the instruction buffer logic to the first execution unit such that the plurality of instructions are executed by the first execution unit, wherein the second execution unit is configured to execute instructions supplied thereto by the instruction buffer logic while the blocking logic blocks instructions from the instruction buffer logic, wherein the multithreaded issue unit is configured to output instructions from a plurality of threads, and wherein the blocking logic includes first and second portions, the first portion configured to block instructions from the instruction buffer logic only for those instructions that are associated with the same thread as that for the sequencer instruction while the second portion does not block instructions from at least one other thread such that instructions from the at least one other thread are not blocked while the sequencer logic is sequentially issuing the plurality of instructions.

25. A method of executing instructions in a processing unit of the type including first and second execution units, instruction buffer logic configured to supply instructions from at least one instruction stream for the first and second execution units, and a multithreaded issue unit coupled to the instruction buffer logic and the first and second execution units, the multithreaded issue unit including first and second issue select logic respectively configured to output instructions to the first and second execution units, the method comprising, in response to receiving a sequencer instruction from the instruction stream and supplied by the instruction buffer logic:

using sequencer logic coupled intermediate the instruction buffer logic and the first execution unit to sequentially issue a plurality of instructions associated with a long latency operation to the first execution unit;

blocking instructions from the instruction buffer logic from being issued to the first execution unit while the sequencer logic sequentially issues the plurality of instructions associated with the long latency operation; and issuing at least one instruction from the instruction buffer logic for execution by the second execution unit while blocking instructions from the being issued to the first execution unit, wherein the multithreaded issue unit is configured to output instructions from a plurality of threads, and wherein blocking instructions from the instruction buffer logic from being issued to the first execution unit while the sequencer logic sequentially issues the plurality of instructions associated with the long latency operation includes blocking only those instructions that are associated with the same thread as that for the sequencer instruction such that instructions from at least one other thread are not blocked while the sequencer logic is sequentially issuing the plurality of instructions.

* * * * *